United States Patent [19]
Nishizawa

[11] Patent Number: 5,152,137
[45] Date of Patent: Oct. 6, 1992

[54] AIR-FUEL RATIO CONTROL SYSTEM FOR AUTOMOTIVE VEHICLE ENGINE

[75] Inventor: Kimiyoshi Nishizawa, Yokohama, Japan

[73] Assignee: Nissan Motor Co., Ltd., Yokohama, Japan

[21] Appl. No.: 750,562

[22] Filed: Aug. 27, 1991

[30] Foreign Application Priority Data

Aug. 27, 1990 [JP] Japan ................... 2-222459

[51] Int. Cl.$^5$ ............................................ F01N 3/20
[52] U.S. Cl. ............................ 60/276; 60/277; 60/285; 60/289
[58] Field of Search ............. 60/276, 277, 285, 289

[56] References Cited

U.S. PATENT DOCUMENTS

| | | | |
|---|---|---|---|
| 4,337,746 | 7/1982 | Masaki | 60/276 |
| 4,385,491 | 5/1983 | Sakurai | 60/276 |
| 4,707,984 | 11/1987 | Katsuno | 60/276 |
| 5,088,281 | 2/1992 | Izutani | 60/276 |

FOREIGN PATENT DOCUMENTS 60-240840 11/1985 Japan .

Primary Examiner—Douglas Hart
Attorney, Agent, or Firm—Foley & Lardner

[57] ABSTRACT

During engine idling, secondary air is introduced into the exhaust conduit at a location upstream of a three-way catalytic converter in order to promote the oxidation of HC and CO. During the supply of secondary air, the output of an air-fuel ratio sensor, which is disposed downstream of the catalytic converter and which is normally used to correct the control provided by an air-fuel ratio sensor located upstream of the catalytic converter and the supply of secondary air, is ignored during the time secondary air is supplied and for a period after the supply of secondary air is stopped.

5 Claims, 5 Drawing Sheets

AIR-FUEL RATIO CONTROL SYSTEM FOR AUTOMOTIVE VEHICLE ENGINE

BACKGROUND OF THE INVENTION

1. Field of the Invention

The present invention relates to an air-fuel ratio control for an internal combustion engine system which includes a catalytic converter for treating the exhaust gases and reducing emissions, and more specifically to an air-fuel control arrangement for such a system wherein secondary air is introduced into the exhaust gases at a location upstream of the catalytic converter.

2. Description of the Prior Art

JP-A-60-240840 discloses an arrangement wherein engine speed M and induction air quantity Q are used do determined the amount of air which is being inducted into the engine cylinder and to derive a basic injection fuel amount Tp (viz., $T = K \cdot Q/N$). This basic injection pulse width Tp is then modified using a correction factor based on engine coolant temperature and the like type of parameter, and a feedback control correction factor which is based on the data fed back from an $O_2$ sensor disposed in the exhaust system.

In order to improve emission control it is known to dispose a three-way catalytic converter in the exhaust system and control the air-fuel ratio (A/F) as close to the stoichiometric air-fuel ratio as possible in order to maximize the efficiency with which CO and HC are oxidized and NOx is reduced.

In order to maintain the A/F as close to the stoichiometric ratio as possible, it is known to utilize two $O_2$ sensors in an arrangement wherein one is disposed upstream of the catalytic converter and the other downstream thereof. The output of the first upstream device is subjected to P.I. control and basically used for air-fuel ratio control while the downstream one is used to adjust a correction factor which is applied to the output of the upstream sensor and compensate for the change in output characteristics which occur with the passing of time. That is to say, $O_2$ sensors which are disposed upstream of the catalytic converters are exposed to conditions which tends induce the degradation of the same.

In order to stabilize engine idling, it has been proposed to clamp the air-fuel ratio control in a manner which forms a rich air-fuel mixture and to supply secondary air into the exhaust gases in order to promote the oxidation of the CO and HC.

However, in the event that a dual $O_2$ sensor system is used, even through the secondary air is introduced into the exhaust gases at a location between the upstream $O_2$ sensor and catalytic converter, the downstream $O_2$ sensor is exposed to exhaust gases which exhibit and A/F which includes the secondary air. As a result the output of the $O_2$ sensor tends to effect erroneous adjustments to the correction factors used to determined the air-fuel ratio control, and when the mode of engine operation changes from idling to a higher load mode, the supply of secondary air is terminated, the arbitrary fuel enrichment stopped and the air-fuel ratio control again performed in accordance with the output of the $O_2$ sensors; due to the modification of the correction factor(s) during the idling period, during the initial period following the end of the idling mode of operation, the air-fuel ratio is deteriorated often to the point of deteriorating the engine performance characteristics.

SUMMARY OF THE INVENTION

It is an object of the present invention to provide an air-fuel control arrangement which can enjoy the benefits of a tandem type air-fuel ratio sensor arrangement and which is free of detrimental influence by the introduction of secondary air into the exhaust system during idling and the like type of low load modes of engine operation.

In brief, the above object is achieved by an arrangement wherein during the supply of secondary air, the output of an air-fuel ratio sensor, which is disposed downstream of the catalytic converter and which is normally used to correct the control provided by an air-fuel ratio sensor located upstream of the catalytic converter and the supply of secondary air, is ignored during the time secondary air is supplied and for a period after the supply of secondary air is stopped.

More specifically, a first aspect of the invention comes in an air-fuel ratio control system for and engine system which includes: a three-way catalytic converter disposed in an exhaust conduit; a source of secondary air which is arranged to introduce secondary air into the exhaust conduit at a location upstream of the catalytic converter under predetermine engine operating conditions, the air-fuel ratio control system featuring: a first air-fuel ratio sensor which is arranged to sense the air-fuel ratio of the exhaust gases at a location upstream of the location at which the source of secondary air introduces air into the exhaust conduit; a second air-fuel ratio sensor which is arranged to sense the air-fuel ratio of the exhaust gases at a location downstream of the catalytic converter; and circuit means operatively connected with the first and second air-fuel ratio sensors for controlling the supply of fuel to the engine, the circuit means including circuitry which: bases the fuel supply control on the output of the first air-fuel ratio sensor, corrects the control based on the output of the second air-fuel ratio sensor, and inhibits the correction control based on the output of the second air-fuel ratio sensor for a predetermined time following the supply of secondary air into the exhaust conduit being stopped.

A second aspect of the present invention comes in an internal combustion engine system which features: sensor means for sensing engine speed and engine load; a catalytic converter disposed in an exhaust gas conduit; a first air-fuel ratio sensor disposed in the exhaust gas conduit upstream of the cataylic converter; a second air-fuel ratio sensor disposed in the exhaust gas conduit downstream of the catalytic converter; fuel injection means for supplying fuel into the engine; secondary air supply means for introducing air into the exhaust conduit at a location between the first air-fuel ratio sensor and the catalytic converter when the engine is indicated as operating in a predetermined mode by the sensor means; a control circuit operatively connected with the sensor means and the fuel injector means, the control circuit including circuitry for: using the output of the sensor means to determine a basic injection pulse width; determining an air-fuel ratio feedback control factor value based on the output of the first air-fuel ratio sensor; determining an actual pulse width by correcting the basic pulse width using air-fuel ratio feedback control factor; modifying the air-fuel ratio feedback control factor based on the output of the second air-fuel ratio sensor; and inhibiting the air-fuel ratio feedback control factor based on the output of the second air-fuel ratio sensor during the time secondary air is supplied into the exhaust conduit by the secondary air supply means and for continuing the inhibition for a predetermined period from the time the supply of secondary air is stopped.

DETAILED DESCRIPTION OF THE PREFERRED EMBODIMENTS

Figure 1:
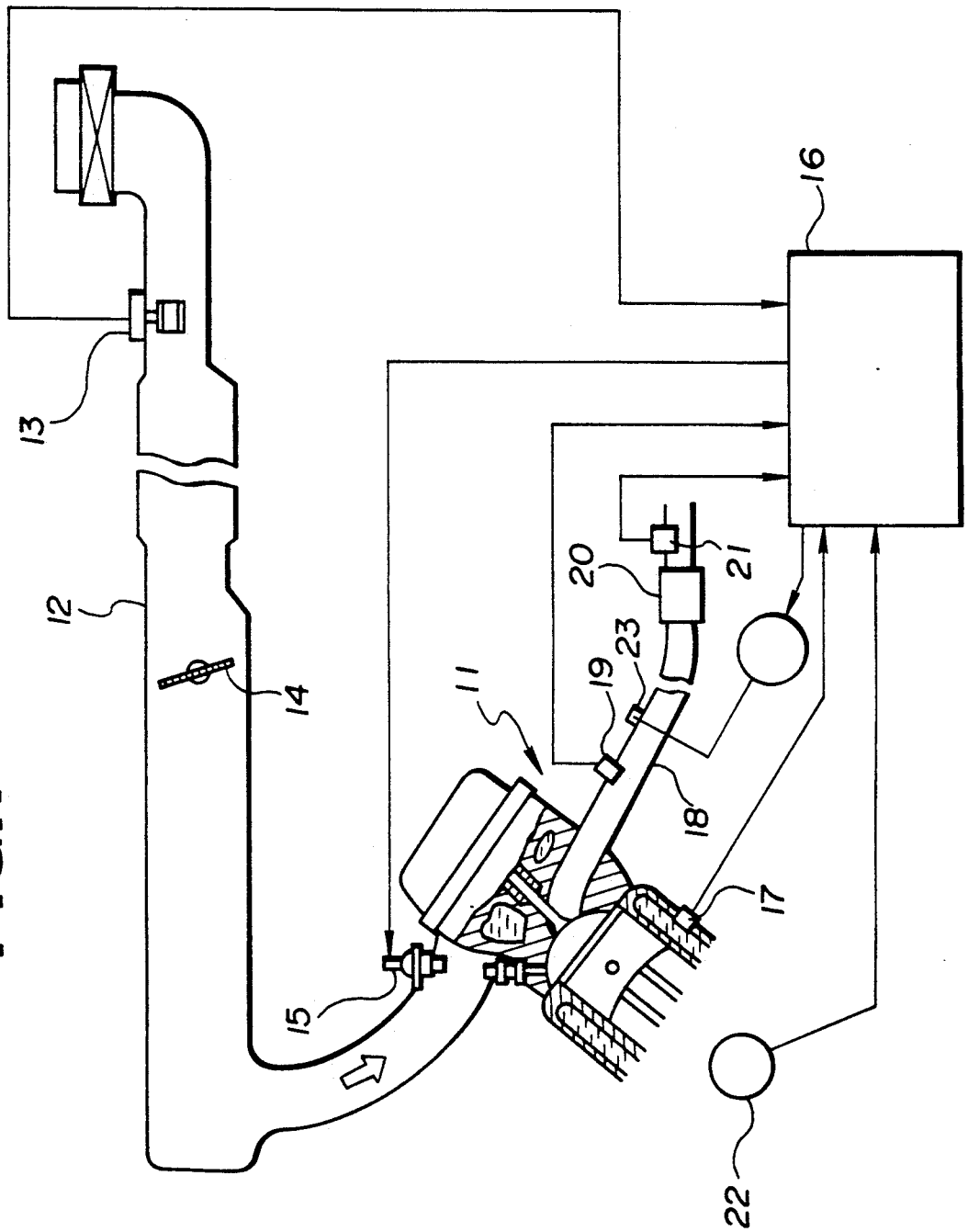
FIG. 1 is a schematic view of an engine system which is equipped with an air-fuel ratio control system according to the present invention.

FIG. 1 shows an engine system comprising an engine generally denoted by the numeral 11, an induction conduit 12, an air flow meter 13 which outputs a signal Q indicative of the amount of air being inducted, an throttle valve 14 which is operatively connected with an accelerator pedal and which is disposed in a throttle chamber defined in the induction conduit 12 downstream of the air-flow meter 13, and fuel injector(s) 15 which are disposed in an induction manifold and arranged to inject fuel toward the induction ports of the engine cylinders.

The fuel injectors 15 are connected with a control unit 16 which includes a microprocessor and which is arranged to produce injection control pulses via which the injection timing and amount is controlled.

A temperature sensor 17 is arranged to detect the temperature of the engine coolant and output a signal Tw indicative of the same.

An exhaust system includes an exhaust conduit 18, a first $O_2$ sensor 19, a three-way catalytic converter 20 which is located downstream of the first $O_2$ sensor, and a second $O_2$ sensor 21 which is located downstream of the catalytic converter 20.

A crank angle sensor 22 is arranged to output a pulse train signal to the control unit 16.

A secondary air supply device 23 is arranged to supply secondary air into the exhaust conduit 18 during engine idling. As shown the secondary air is introduced at a location between the first $O_2$ sensor 19 and the three-way catalytic converter 20.

The microprocessor included in the control unit 20 is arranged to determine the frequency of the pulse train signal output by the crank angle sensor 22 and derive an engine speed indicative value N therefrom. Additionally it is arranged to run routines of the nature depicted in FIGS. 2, in order to control the air-fuel ratio and the supply of secondary air.

Figure 2:
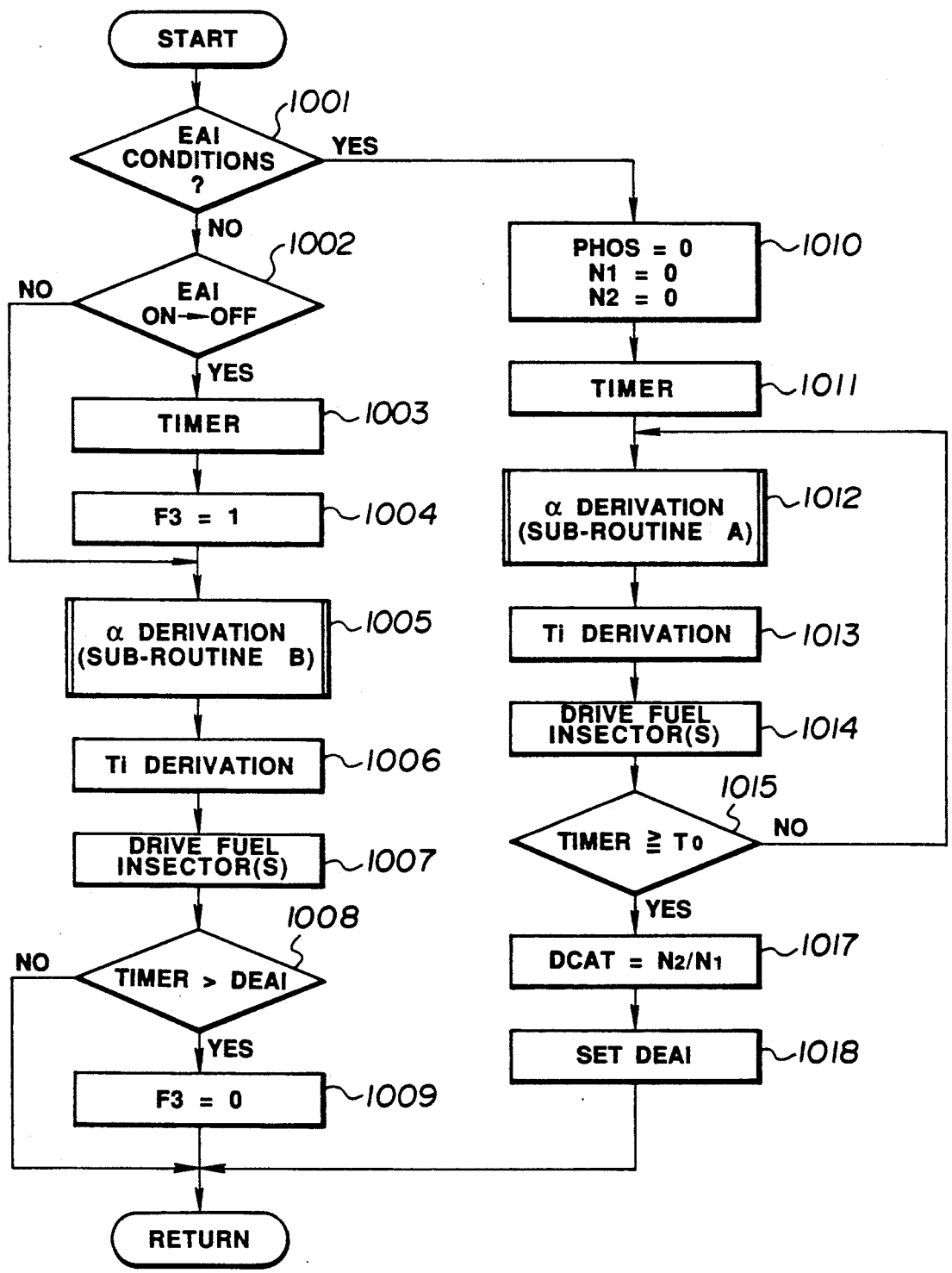
FIGS. 2 to 5 are flow charts depicting the steps which characterize air-fuel ratio feedback control factor setting routines utilized in an embodiment of the present invention.

The routine shown in FIG. 2 is run at predetermined intervals. The first step 1001 of this routine is such as to determine if the engine is operating under conditions which permit the injection of secondary air into the exhaust (viz., EAI—exhaust air injection). In the event that the conditions for the same are not met (viz., the engine is not idling) the routine flows to step 1002 wherein it is determined if exhaust air injection EAI has just been stopped or not. In the event that such a mode of operation has in fact just been terminated (viz., changed from ON to OFF) the routine goes to steps 1003 and 1004 wherein a timer TIMER is started and a flag F3 is set (F3=1). Following this, in steps 1005 a sub-routine B (see FIG. 3) is used to derive an air-fuel ratio feedback control feedback correction factor α.

Figure 3:
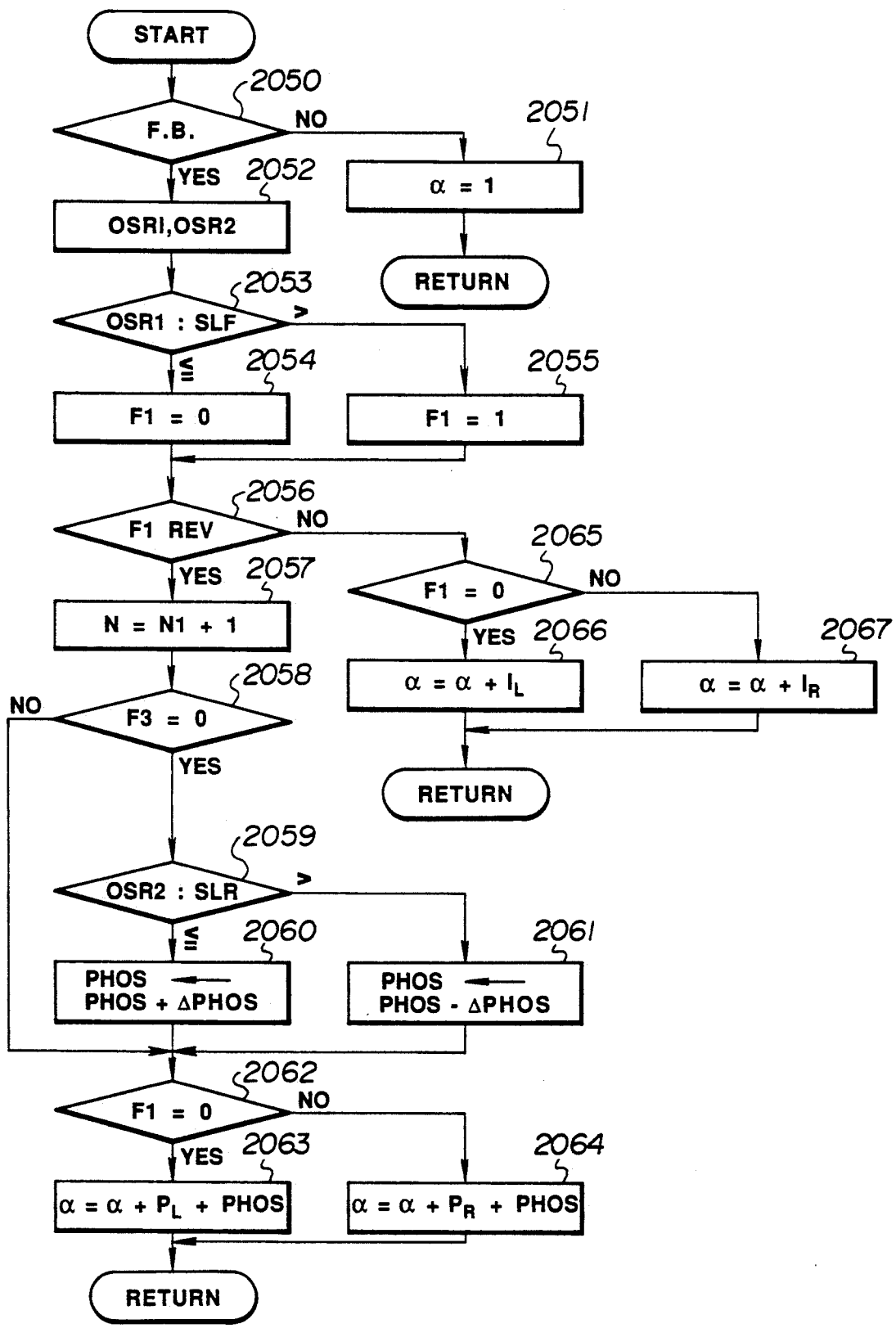

As shown in FIG. 3, the first step 2050 of sub-routine B is such as to determine if conditions which enable the output of the upstream $O_2$ sensor to be used for feedback control purposes exist or not. By way of example, it is determined if engine coolant temperature is above a preset value Tw (in this case 70° C.) if the engine throttle fully opened and/or if the engine load/engine speed ratio Qa/Ne is less than a predetermine ratio.

In the event of a negative outcome, the routine goes to step 2051 wherein the value of α is set to 1 (α=1) and the routine returns. On the other hand, in the case of a positive outcome the routine flow to step 2052 wherein the outputs (analog voltage signals) of the upstream and downstream $O_2$ sensors 19 and 21 (OSR1 and OSR2) are AD converted and read in. Following this, in step 2053 the magnitude of the first (upstream) sensor output OSR1 is compared with a reference value SLF. In the event that OSR1 ≦ than SLF the air-fuel mixture is indicated as being lean and the routine goes on to step 2054 wherein it the status of a rich-lean Flag F1 is cleared (F1=0). On the other hand, in the event that OSR1>SLF (indicative of an air-fuel mixture richer than stoichiometric) then in step 2055 the flag F1 is set (F=1).

In step 2056 it is determined if the status of flag F1 has changed from that set in the last run of the instant routine. That is to say, it is determined if F1 has reversed its status or not. In the event of an affirmative outcome, the routine goes to step 2057 wherein a counter N1 is incremented and then checks the status of flag F3 in step 2058.

In the event that flag F3 has not been set (F3=0) the routine proceeds to step 2059 wherein the instant output level of the rear downstream $O_2$ sensor OSR2 is compared with a predetermined reference slice level SLR. In the event that OSR2≦SLR indicative that the air-fuel ratio of the exhaust gases issuing from the three-way catalytic converter 20 exhibit is on the lean side of stoichiometric, the sub-routine flows to step 2060 wherein the value of PHOS is increased by a predetermined amount ΔPHOS (wherein ΔPHOS>0 and wherein PHOS is a value used to modify the proportional component values used in deriving the α value).

On the other hand, if the outcome of step 2059 is such as to indicate that OSR2>SLR (rich) the routine goes to step 2061 wherein the value of PHOS is decemented by ΔPHOS.

It should be noted that in the event that flag F3 has been set the routine by-passes steps 2059–2061 and thus "ignores" the output OSR2 of the second downstream $O_2$ sensor 21. This condition is maintained until such time as the flag F3 is cleared.

Following the adjustment of PHOS the routine goes to step 2062 wherein the status of flag F1 is checked. In the event that F1 has been cleared (F1=0) as a result of the detection of a lean air-fuel mixture upstream of the catalytic converter 20 (step 2053) the routine goes to step 2063 wherein the feedback correction factor α is derived as follows:

$$\alpha = \alpha + PL + PHOS \qquad (1)$$

On the other hand, if the outcome of step 2062 is such as to indicate F=1, the routine goes to step 2064 wherein the feedback correction factor α is derived as follows:

$$\alpha = \alpha + PR - PHOS \qquad (2)$$

It will be noted that in the above equations PL and PR denote rich and lean proportional components respectively.

However, in the event that the outcome of step 2056 is such as to indicate that not reversal in the F1 flag status has just occured, the routine goes across to step 2065 wherein the value of flag F1 is used to indicate if the instant upstream air-fuel ratio is rich or lean and to accordingly direct the routine to one of steps 2066 and 2067. In the event that the air-fuel ratio has been found to be on the lead side, the routine goes to step 2066 wherein the feedback control correction factor $\alpha$ is incremented by an amount IL; while in the case the air-fuel ratio has been found to be on the rich side the routine goes to step 2067 wherein the feedback correction factor $\alpha$ is decremented by an amount IR. It will be noted that IL and IR denote integrated components.

Returning to the flow chart shown in FIG. 2, following the running of the B sub-routine shown in FIG. 3, at step 1006 an fuel injection pulse width Ti is derived. This derivation involves obtaining a basic injection pulse width value Tp using the following equation:

$$Tp = K \cdot \frac{Q}{N} \qquad (3)$$

wherein K is a constant, Q is the amount of air being inducted into the engine (i.e. engine load) and N is the engine speed.

This Tp value is then modified using a COEF factor which takes the effect of engine temperature (as indicated by Tw) and like type of parameters into account, and a value Ts which represents the rise time of the injectors. Viz.:

$$Ti = Tp \cdot COEF \cdot \alpha + Ts \qquad (4)$$

In step 1007 the just derived value of Ti is used to derive a suitable signal which is output to the fuel injectors 15.

At step 1008 the value of TIMER which was incremented in step 1003 is compared with a predetermined value DEIA which represents the delay period for which it is preferred to inhibit the correction which utilizes the output of the second downstream O2 sensor 21 following the termination of exhaust air injection (EIA).

During the period TIMER$\leq$DEAI, the setting of flag F3 is maintained at F=1 and thus during this period updating of the air-fuel ratio correction value PHOS is prevented. However, when the TIMER count exceeds DEAI (Viz., TIMER>DEAI) the routine flows to step 1009 wherein flag F3 is reset and the inhibition which prevents the PHOS update based on the output of the downstream O2 sensor 21, is lifted.

On the other hand, in the event it is found in step 1001 that conditions which require EAI (exhaust air injection) exist, the routine is directed across to step 1010 wherein the value of PHOS is set to zero, and counters N1 and N2 which count the number of times the outputs of the upstream and downstream O2 sensors 19 and 21, exhibit reversals with respect to their respective slice levels SLF and SLR, are both cleared.

Following this in step 1011, TIMER is set running and in step 1012 a sub-routine A is run.

Figure 4:
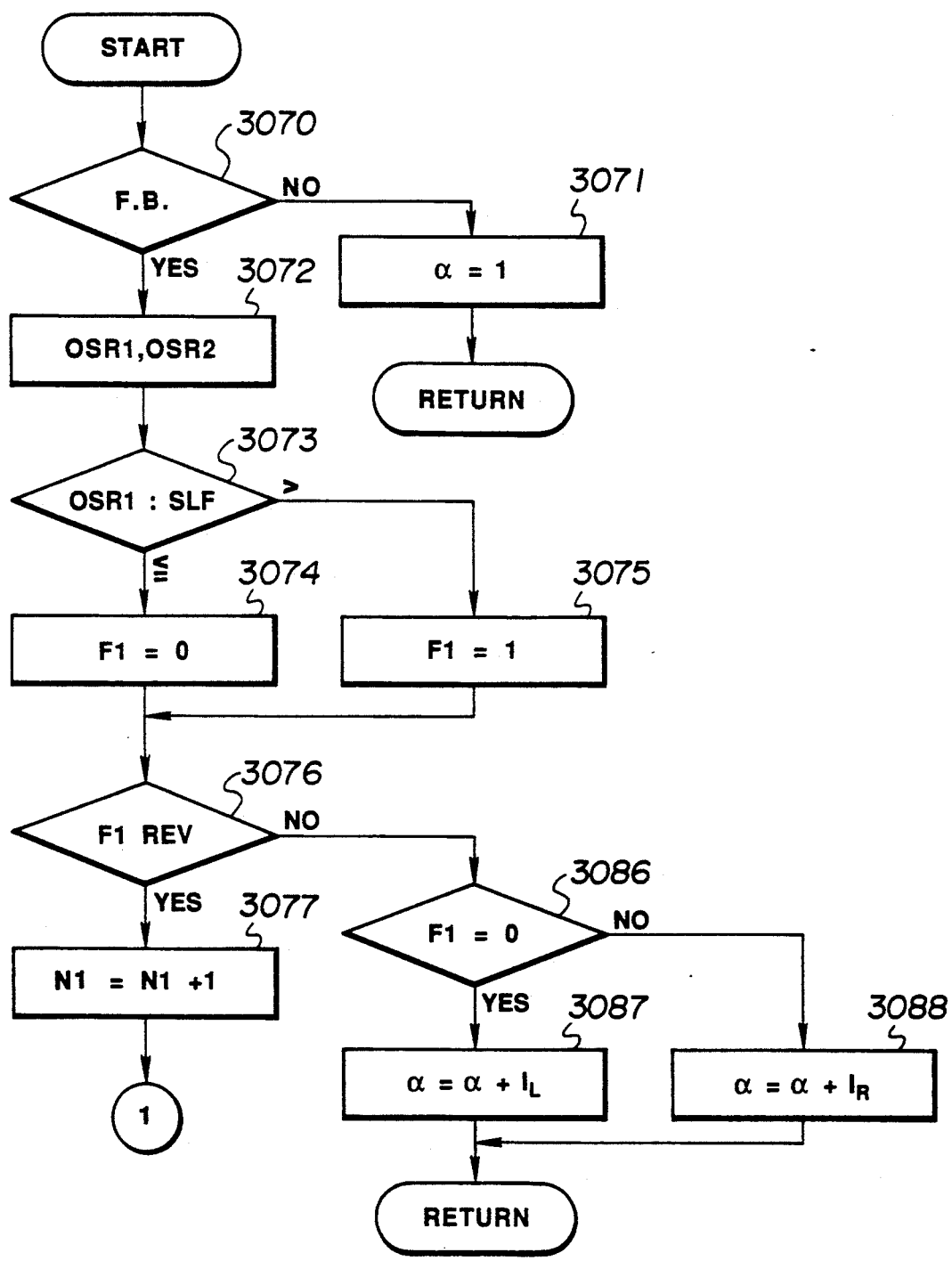
Figure 5:
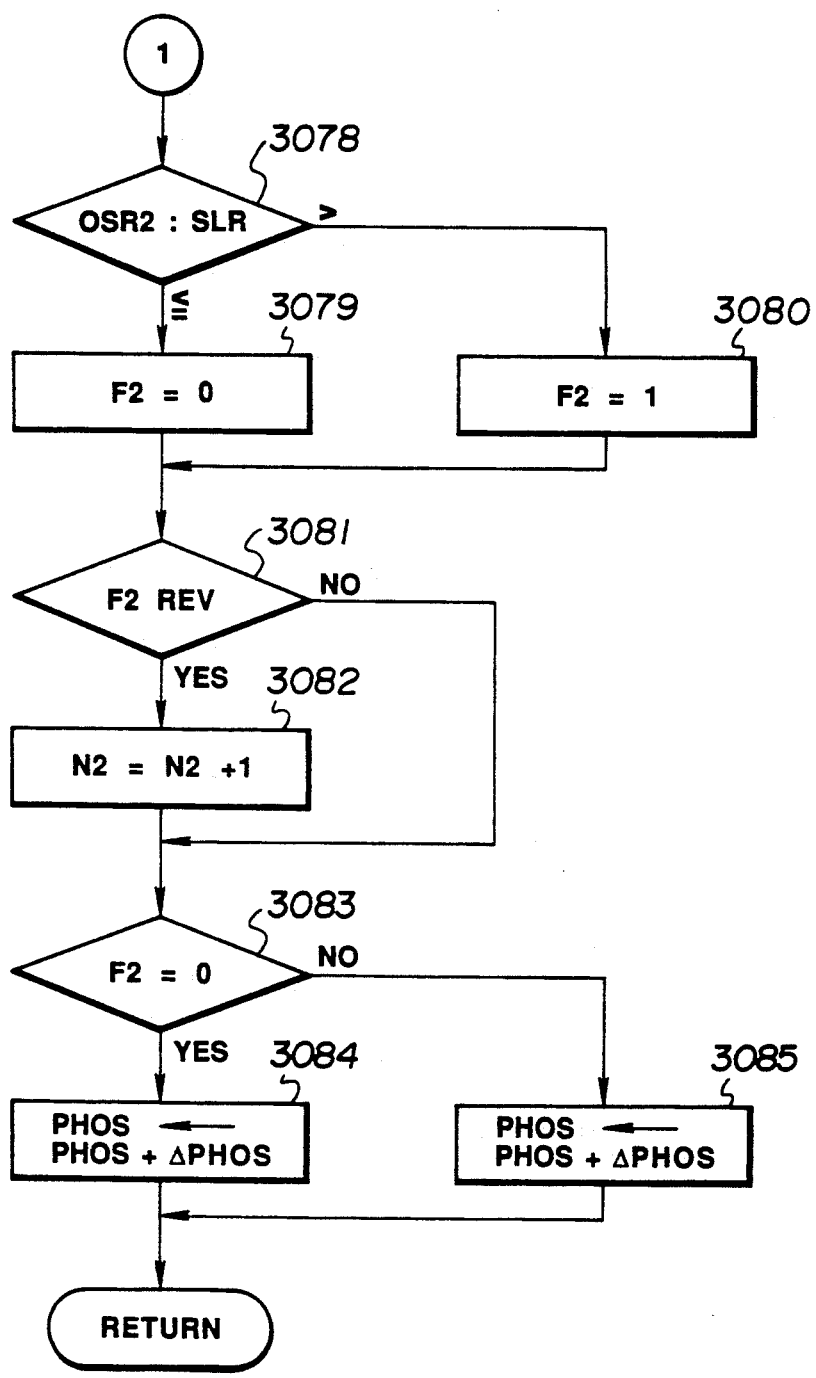

FIG. 4 shows the steps which characterize the just mentioned sub-routine A. As will be appreciated, sub-routines A and B are quite similar in nature. In sub-routine A steps 3077 to 3077 are the same as steps 2050 to 2057; steps 3083 to 3085 are the same as steps 2062 to 2065; 3086–3088 are the same as 2056–2067. This routine differs in that the flag 3 checking step 2058 is omitted and in that step 2059 is the same as step 3078 (see FIG. 5) while steps 3079 and 3080 clear and set a flag F2, and in step 3083 a counter N2 is incremented each time the OSR2 signal from the downstream O2 sensor crosses the slice level SLR.

Following the completion of the sub-routine A, the routine shown in FIG. 2 proceeds through steps 1013 and 1014 wherein the same operations as disclosed in connection with steps 1005 and 1006 are executed. Following step 1014, the current count of TIMER is compared with a predetermined value To in step 1015. In this instance To is selected to represent a time of 20 seconds (by way of example). Until this time is up, the routine loops back to step 1012.

However, upon To being exceeded the routine goes to step 1017 wherein the N1 and N2 counts (representative of the number of times the signals OSR1 and OSR2 have cross the slice levels SLF and SLR) are used to derive a ratio DCAT (DCAT=N2/N1).

As will be appreciated, when N2 is larger than N1, the value of DCAT increases. This indicates that the three-way catalytic converter residual air (oxygen) capacity is small and induces the frequency with which the output of the downstream O2 sensor 21 crosses the slice level SLR, to increase. This of course increases the N2 count. As a result, the delay with which the output of the downstream O2 sensor 21 changes with respect to the output of the upstream one 19, reduces. Under these conditions the DEAI time for which correction control based on output of the downstream O2 sensor should be delayed can be reduced. In other words DCAT varies inversely with the capacity of the catalytic converter to retain residual air and when DCAT is high the DEAI period can be reduced and vice versa.

In step 1018 is set using the following equation:

$$DEAI = A + B/DCAT \qquad (5)$$

wherein A and B are constants.

The above arrangement is such that while flag F3 is set to 1 the correction using the output of the second downstream O2 sensor is inhibited any detrimental effect on the air-fuel ratio control is avoided. More specifically, the problem wherein the output of the downstream O2 sensor responds to the presence of the secondary air in a manner which causes the same to erroneously indicate the supply of a lean mixture to the combustion chambers of the engine, is obviated.

With the instant invention it is possible to vary the DEAI period in accordance with the condition of the three-way catalytic converter and reduce the time during which the output of the downstream O2 sensor is not used for correction purposes, to a minimum.

It should also be noted that the present invention is not limited to arrangements wherein the output of the upstream O2 sensor is used for feedback control and the output of the downstream sensor used for correction purposes and that in order to set the feedback correction factor it is within the scope of the present invention to use the output of the downstream sensor to adjust the slice level against which the output of the upstream sensor is compared.

What is claimed is:

1. An air-fuel ratio control system for and engine system which include:
   a three-way catalytic converter disposed in an exhaust conduit;
   a source of secondary air which is arranged to introduce secondary air into the exhaust conduit at a location upstream of the catalytic converter under predetermine engine operating conditions, the air-fuel ratio control system comprising:
   a first air-fuel ratio sensor which is arranged to sense the air-fuel ratio of the exhaust gases at a location upstream of the location at which the source of secondary air introduces air into the exhaust conduit;
   a second air-fuel ratio sensor which is arranged to sense the air-fuel ratio of the exhaust gases at a location downstream of the catalytic converter; and
   circuit means operatively connected with said first and second air-fuel ratio sensors for controlling the supply of fuel to the engine, said circuit means including circuitry which:
   bases the fuel supply control on the output of the first air-fuel ratio sensor,
   corrects the control based on the output of the second air-fuel ratio sensor, and
   inhibits the correction control based on the output of the second air-fuel ratio sensor for a predetermined time following the supply of secondary air into the exhaust conduit being stopped.

2. An air-fuel ratio control system as claimed in claim 1 wherein the predetermined time is variable in accordance with the capacity of the catalytic converter to retain residual air.

3. An air-fuel ratio control system as claimed in claim 2 wherein said circuit means includes circuitry for monitoring the outputs of said first and second air-fuel ratio sensors for a predetermined period of time during the supply of air into the exhaust conduit and for determining a factor which varies inversely with the capacity and the inverse of which is used to determine said predetermined time.

4. An air-fuel ratio control system as claimed in claim 1 wherein the inhibition of the correction based on the output of the second air-fuel ratio sensor is additionally implemented during the time the secondary air is being supplied into the exhaust conduit.

5. An internal combustion engine system comprising:
   sensor means for sensing engine speed and engine load;
   a catalytic converter disposed in an exhaust gas conduit;
   a first air-fuel ratio sensor disposed in the exhaust gas conduit upstream of the catalytic converter;
   a second air-fuel ratio sensor disposed in the exhaust gas conduit downstream of said catalytic converter;
   fuel injection means for supplying fuel into the engine;
   secondary air supply means for introducing air into the exhaust conduit at a location between said first air-fuel ratio sensor and said catalytic converter when the engine is indicated as operating in a predetermined mode by said sensor means;
   a control circuit operatively connected with said sensor means and said fuel injector means, said control circuit including circuitry for;
   using the output of said sensor means to determine a basic injection pulse width;
   determining an air-fuel ratio feedback control factor value based on the output of said first air-fuel ratio sensor;
   determining an actual pulse width by correcting the basic pulse width using air-fuel ratio feedback control factor;
   modifying the air-fuel ratio feedback control factor based on the output of said second air-fuel ratio sensor; and
   inhibiting the air-fuel ratio feedback control factor based on the output of said second air-fuel ratio sensor during the time secondary air is supplied into the exhaust conduit by the secondary air supply means and for continuing the inhibition for a predetermined period from the time the supply of secondary air is stopped.

* * * * *